United States Patent [19]
Goodwin, III

[11] Patent Number: 5,771,005
[45] Date of Patent: Jun. 23, 1998

[54] AUXILIARY DISPLAY FOR AN ELECTRONIC PRICE LABEL

[75] Inventor: John C. Goodwin, III, Suwanee, Ga.

[73] Assignee: NCR Corporation, Dayton, Ohio

[21] Appl. No.: 603,006

[22] Filed: Feb. 16, 1996

[51] Int. Cl.$^6$ .................................................. G06F 7/12
[52] U.S. Cl. .............................. 340/825.35; 340/825.17; 235/383
[58] Field of Search ........................ 340/825.35, 825.17; 235/383; 395/216, 220; 364/401, 479.01, 479.08; 40/5; 403/228; 345/1, 2; 705/16, 20, 21

[56] References Cited

U.S. PATENT DOCUMENTS

| | | | |
|---|---|---|---|
| 5,172,314 | 12/1992 | Poland et al. | 364/401 |
| 5,263,269 | 11/1993 | Tjarnlund | 40/5 |
| 5,344,250 | 9/1994 | Kringel et al. | 403/228 |
| 5,401,947 | 3/1995 | Poland | 235/383 |
| 5,448,226 | 9/1995 | Failing, Jr. et al. | 340/825.35 |

*Primary Examiner*—Edwin C. Holloway, III
*Attorney, Agent, or Firm*—Paul W. Martin; Peter H. Priest

[57] ABSTRACT

An auxiliary display assembly for an electronic price label which is easily added and removed from electronic price labels requiring additional display area. The auxiliary display includes a display and an electrical connector coupled to the display which couples to another electrical connector on the electronic price label. The auxiliary display is suitable for displaying promotional messages, which may include price information. Circuitry within the electronic price label senses connection of the auxiliary display to the electronic price label. The circuitry sets a configuration bit within a memory of the electronic price label. Auxiliary display management software executed by a terminal queries the electronic price label for the presence of the auxiliary display and sends data to the electronic price label for display by the auxiliary display.

17 Claims, 6 Drawing Sheets

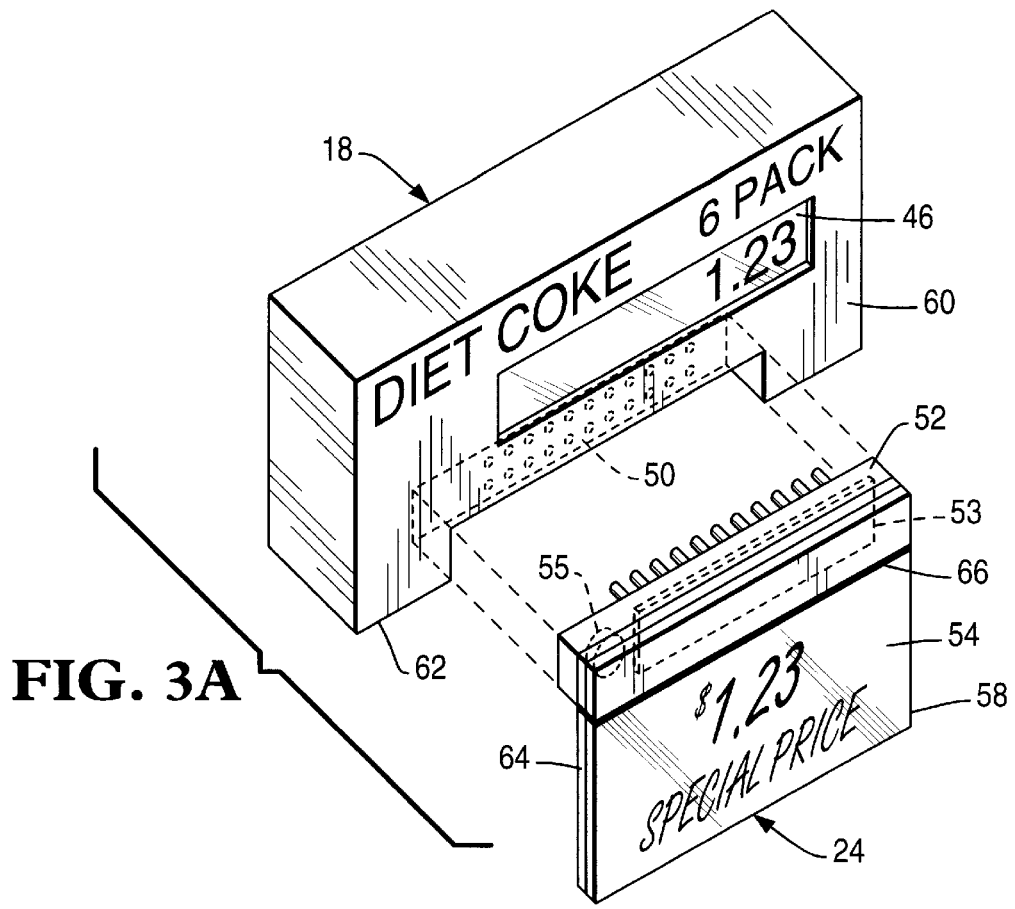
FIG. 3A
FIG. 3B
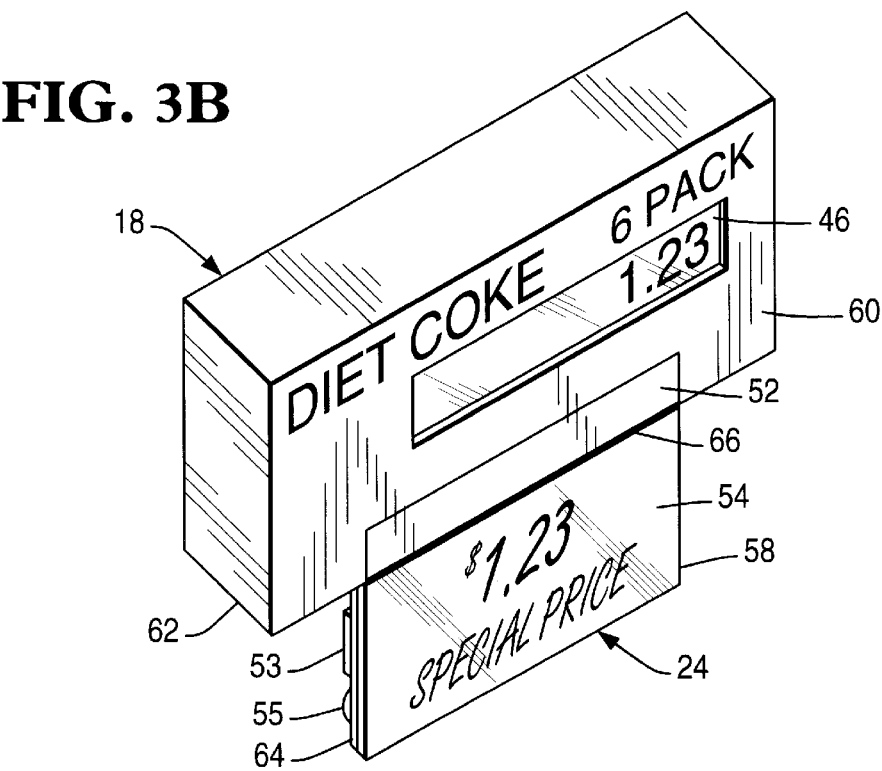

AUXILIARY DISPLAY FOR AN ELECTRONIC PRICE LABEL

BACKGROUND OF THE INVENTION

The present invention relates to electronic price label (EPL) systems used in transaction establishments, and more specifically to an auxiliary display for an electronic price label.

EPL systems typically include a plurality of EPLs for each merchandise item in a store. EPLs typically display the price of corresponding merchandise items on store shelves and are typically attached to a rail along the leading edge of the shelves. A store may contain thousands of EPLs to display the prices of the merchandise items. The EPLs are coupled to a central server from where information about the EPLs is typically maintained in an EPL data file. Price information displayed by the EPLs is obtained from the PLU file.

EPLs today may be wired or wireless. Wireless EPLs may employ infrared or radio frequency transmitters to transmit acknowledgment signals acknowledging receipt of messages and to relay acknowledgment signals from other EPLs to receiving devices coupled to a main EPL computer. An EPL only sends an acknowledgment if the message is addressed to it.

Items that are "On Sale" or heavily promoted within a store are typically identified by special paper tags called "shelf talkers" or "bibs" which are attached to shelves. These paper tags must be installed and removed by store personnel. Unfortunately, price information stored within the PLU file may change before or after the paper tags are removed. Thus, customers may become confused and price mismatch may occur between the price in the PLU file and the price on the paper tag.

Therefore, it would be desirable to provide a shelf talker that is synchronized with the PLU file through an electronic price label system so that customer confusion is minimized. It would also be desirable to provide a method for determining whether a shelf talker is connected to an electronic price label.

SUMMARY OF THE INVENTION

In accordance with the teachings of the present invention, an auxiliary display for an electronic price label is provided.

An auxiliary display assembly for an electronic price label which is easily added and removed from electronic price labels requiring additional display area. The auxiliary display includes a display and an electrical connector coupled to the display which couples to another electrical connector on the electronic price label. The auxiliary display is suitable for displaying promotional messages, which may include price information.

Circuitry within the electronic price label senses connection of the auxiliary display to the electronic price label. The circuitry sets a configuration bit within a memory of the electronic price label. Auxiliary display management software executed by a terminal queries the electronic price label for the presence of the auxiliary display and sends data to the electronic price label for display by the auxiliary display.

It is accordingly an object of the present invention to provide an auxiliary display for an electronic price label.

It is another object of the present invention to provide an auxiliary display for an electronic price label that provides additional display area for promotional messages.

It is another object of the present invention to provide an auxiliary display for an electronic price label that works in conjunction with another display within the electronic price label.

It is another object of the present invention to provide an auxiliary display for an electronic price label that is easily recognized during installation and that is easily monitored while connected to an electronic price label.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIGS. 3A and 3B illustrate a first embodiment of the auxiliary display;

DETAILED DESCRIPTION OF THE PREFERRED EMBODIMENT

Figure 1:
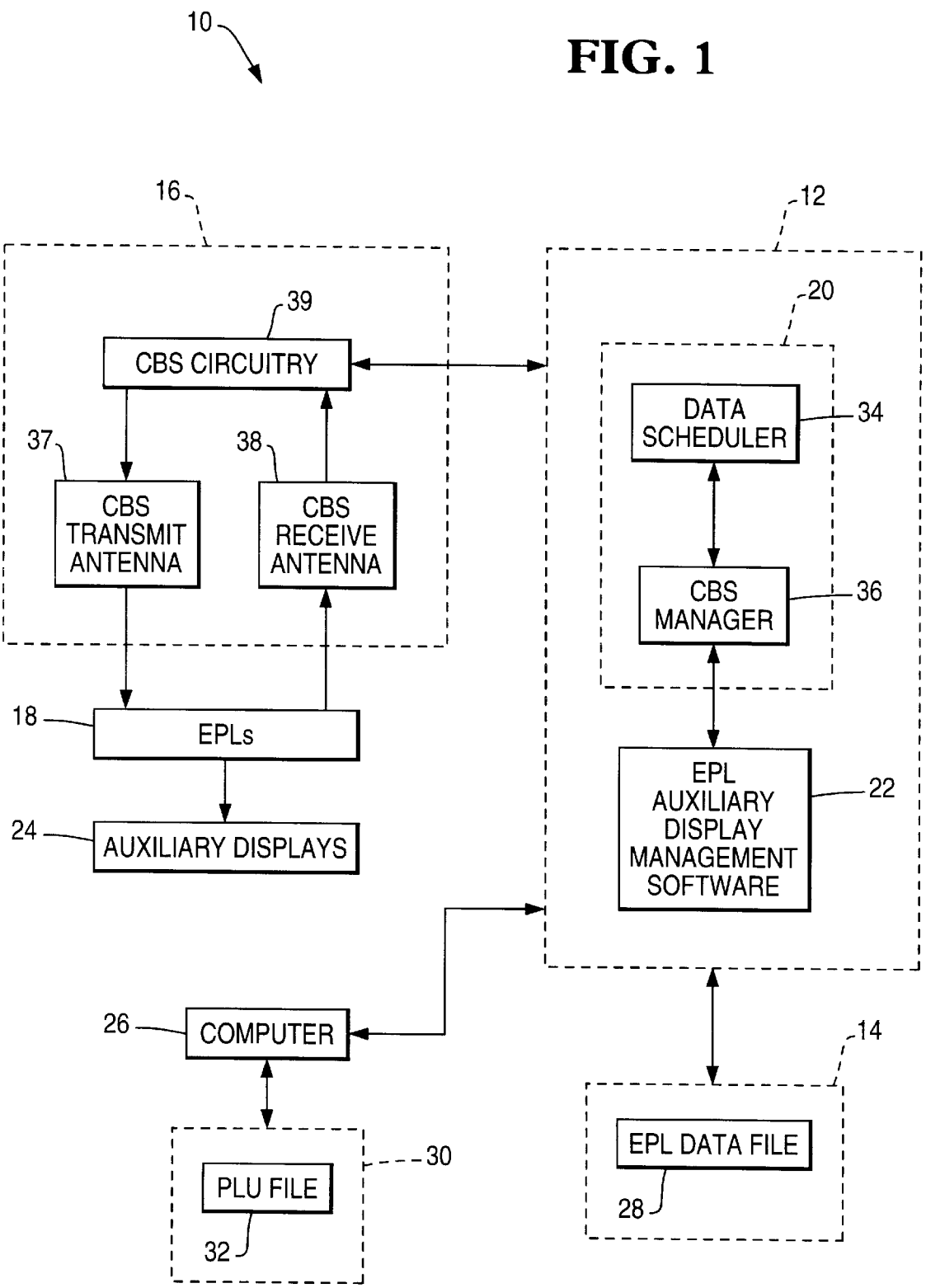
FIG. 1 is a block diagram of an EPL system.

Referring now to FIG. 1, EPL system 10 includes computer 12, storage medium 14, communication base station (CBS) 16, electronic price labels (EPLs) 18, auxiliary displays 24, computer 26, and storage medium 30.

Computer 12 executes EPL control software 20 and EPL auxiliary display management software 22. EPL control software 20 records, schedules, and transmits all messages to EPLs 18 through CBS 16, and receives and analyzes status messages from EPLs 18 through CBS 16. EPL control software 20 also maintains and uses EPL data file 28, which contains item information, EPL identification information, item price verifier information, and status information for each of EPLs 18.

EPL control software 20 primarily includes data scheduler 34 and CBS manager 36. Data scheduler 34 schedules EPL price change messages to be sent to EPLs 18 through CBS 16.

Figure 2:
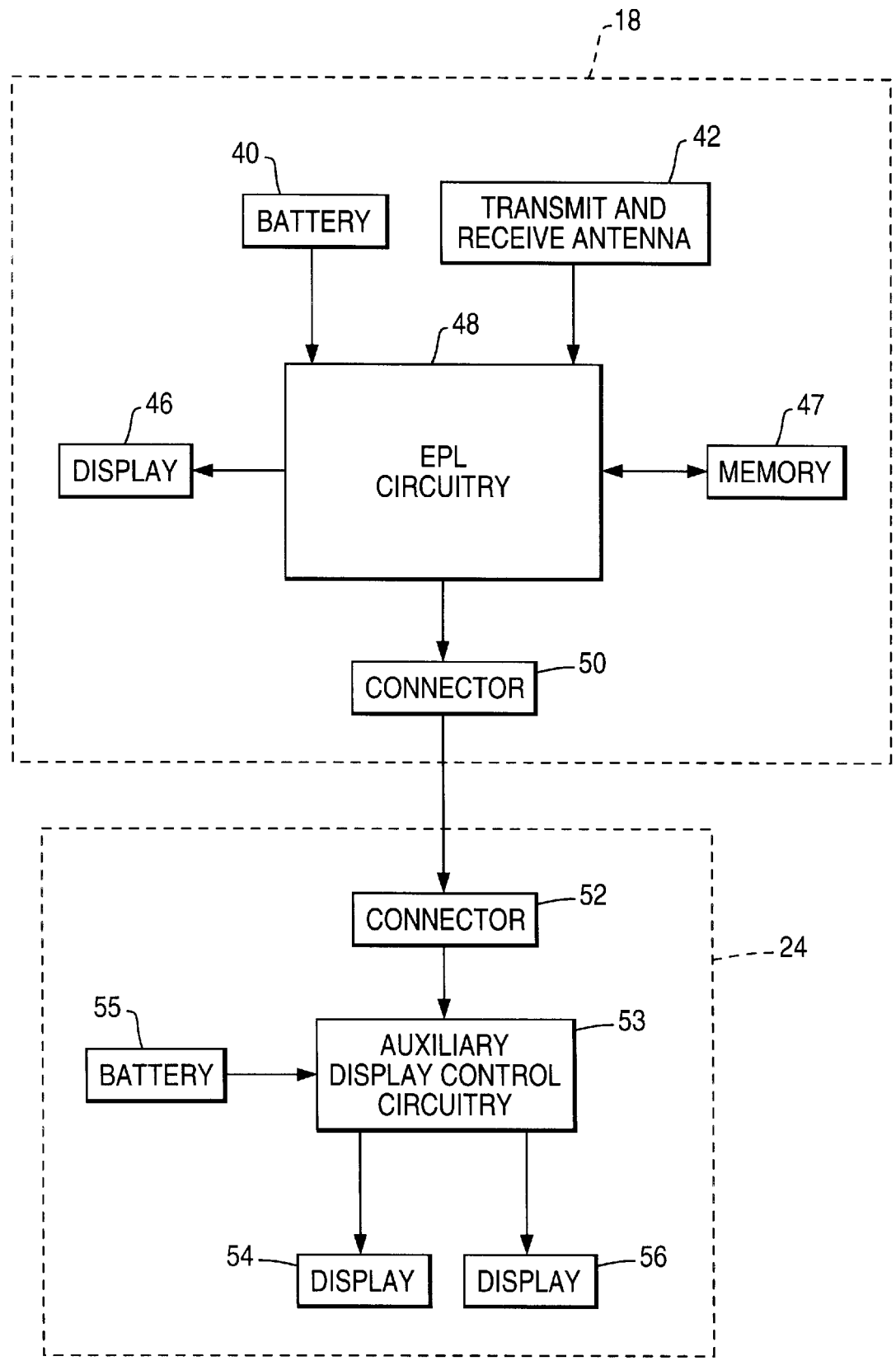
FIG. 2 is a block diagram of an EPL and an auxiliary display.

EPL auxiliary display management software 22 determines whether auxiliary displays 24 are connected to EPLs 18 by reading a configuration bit in memory 47 set by EPL circuitry 48 (FIG. 2). EPL auxiliary display management software 22 tracks displays 24 and produces reports for store personnel. Auxiliary display information may be used to notify personnel that the right or wrong auxiliary display 24 is connected to an EPL 18. Additionally, this information may be used to notify personnel that an EPL 18 has an auxiliary display 24 when it shouldn't.

EPL auxiliary display management software 22 sends data to auxiliary displays 24 to be displayed if auxiliary displays 24 are connected. The data displayed by auxiliary displays 24 may include announcements, slogans, or other messages. The data may also be the same information displayed by the corresponding EPLs.

Storage medium 14 is preferably a fixed disk drive. Storage medium 14 stores EPL data file 28.

CBS 16 preferably includes one transmit antenna 37 and up to four receive antennas 38 for transmitting and receiving messages between CBS 16 and EPLs 18. CBS 16 includes CBS circuitry 39 which controls operation of CBS 16. EPL system 10 preferably includes a plurality of CBSs 16 connected together in series.

CBS manager 36 schedules transmission of price change messages to EPLs 18 and the reception of status messages from EPLs 18 for predetermined time slots. CBS manager 36 also schedules transmission of data to auxiliary displays 24 and the reception of messages acknowledging the presence of auxiliary displays 24 from those EPLs having auxiliary displays 24.

Computer 26 manages price changes within PLU file 32. PLU file 32 is stored within storage medium 30, which is preferably a fixed disk drive. Computer 12 obtains price information for EPLs 18 from PLU file 32. Computer 26 and computer 12 are here shown as two separate computers, although both EPL and PLU management functions can be performed using a single computer.

Turning now to FIG. 2, EPLs 18 and auxiliary displays 24 are illustrated.

EPLs 18 each include battery 40, transmit and receive antenna 42, display 46, memory 47, EPL circuitry 48, and connector 50.

Battery 40 provides power to EPLs 18. Alternatively, other sources of power, such as solar power or external power connected through a cable, may be employed.

Transmit and receive antenna 42 receives price change and status messages from CBS 16.

Transmit and receive antenna 42 transmits responses to price change and status messages to CBS 16.

Display 46 displays price and possibly additional information. Display 46 is preferably a liquid crystal display (LCD).

After auxiliary display 24 is attached, display 46 may display different information. For example, suppose EPL 18 is displaying "$1.99/WAS $2.49" before auxiliary display 24 is attached. After 24 is attached, EPL 18 may display only "$1.99", while auxiliary display 24 displays "WAS 2.49" or "$1.99/WAS $2.49". EPL circuitry 48 determines not only that auxiliary display 24 is attached, but also its type. The type information can be used to alter the functionality of the EPL 18 while auxiliary display 24 is attached. If and when auxiliary display 24 is removed, EPL 18 reverts back to the original display functionality of "$1.99/WAS $2.49" or new pricing information sent by CBS manager 36 and EPL auxiliary display management software 22.

Memory 47 stores price verifier information, EPL type information, and may additionally store promotional information. Preferably, the price verifier information is a checksum of the displayed price. The EPL type information distinguishes EPLs 18 having auxiliary displays 24 from other EPLs, and if there are different types of auxiliary displays 24, from other types of auxiliary displays 24. Memory also stores a configuration bit indicating that auxiliary display 24 is attached.

EPL circuitry 48 controls the internal operation of EPLs 18 and determines whether auxiliary displays 24 are connected to EPLs 18. EPL circuitry 48 sets the configuration bit in memory 47 if auxiliary display 24 is attached. When auxiliary display 24 is connected, EPL circuitry 48 updates auxiliary display 24 with its assigned information.

Connector 50 receives a corresponding connector 52 on auxiliary display 24. Connectors 50 and 52 allow auxiliary displays 24 to be inserted and removed for use anywhere in the store. The location of auxiliary displays 24 is tracked through EPL system 10.

Auxiliary display 24 includes connector 52, auxiliary display control circuitry 53, display 54, and in a second embodiment, display 56.

Auxiliary display control circuitry 53 receives information to be displayed through EPL circuitry 48 and is preconfigured to provide an indication to EPL circuitry of the type of auxiliary display that is attached when different types of auxiliary displays 24 are employed.

Displays 54 and 56 are preferably LCDs. To enhance the promotional capability of auxiliary displays 24, displays 54 and 56 may display colors. They may also include color silk screening.

Auxiliary displays 24 can provide shelf talker functions by displaying customized eye-catching messages and/or price information from PLU file 32 to attract customers. The displayed information can be more accurately maintained than paper shelf talker displays, since the displayed information is managed through EPL system 10 in the same way that price information is managed. Use of such a display allows promotional messages to be flashed. Different types of auxiliary displays 24 may be visually distinguished from each other by the information displayed or by the silk screening colors.

Turning now to FIGS. 3A and 3B, a first embodiment of auxiliary display 24 is illustrated in more detail.

Connector 50 is preferably recessed within the lower half of EPL 18 so that the outer surface 58 of display 54 is flush with the outer surface 60 of EPL 18 when connector 52 is inserted within connector 50. Here, connector 50 is shown adjacent to bottom surface 62 of EPL 18. Connector 50 is shown as a female connector and connector 52 is shown as a male connector, although the present invention envisions other connectors, including connectors having the opposite gender.

Display 54 is oriented generally parallel to the host EPL 18. To minimize the possibility of damage to display 54, display 54 is preferably mounted on a flexible circuit 64 and/or hinged along a line 66 at the base of connector 52.

Battery 55 and auxiliary display control circuitry 53 are preferably located within connector 52, but may also be located behind display 54.

Figure 4A:
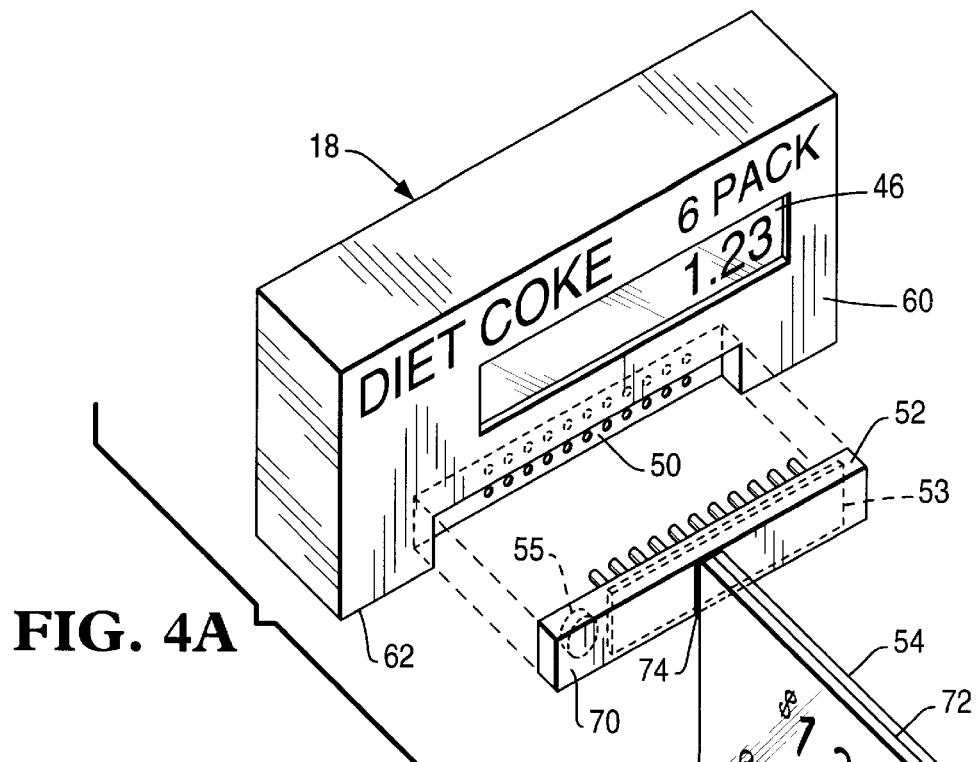
FIGS. 4A and 4B illustrate a second embodiment of the auxiliary display.
Figure 4B:
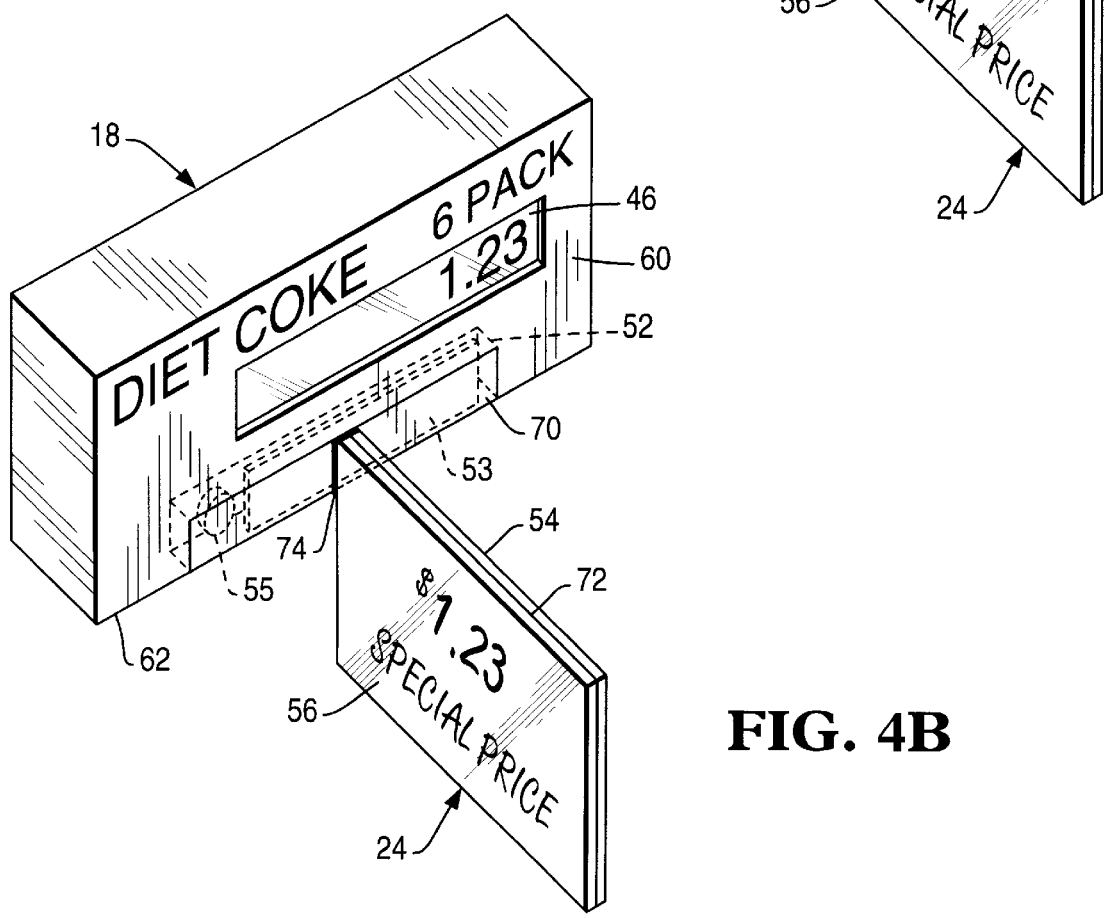

Turning now to FIGS. 4A and 4B, a second embodiment of auxiliary display 24 is illustrated in more detail.

Connector 50 is preferably recessed within the lower half of EPL 18. When used in conjunction with auxiliary displays of the first embodiment, connector 52 of the auxiliary displays of the second embodiment is slightly wider so that the outer surface 70 of connector 52 is flush with the outer surface 60 of EPL 18 when connector 52 is inserted within connector 50. Here, connector 50 is shown adjacent to bottom surface 62 of EPL 18. Connector 50 is shown as a female connector and connector 52 is shown as a male connector, although the present invention envisions other connectors, including connectors having the opposite gender.

Displays 54 and 56 are preferably mounted on opposite sides of a flexible circuit 72 and oriented generally perpendicular to connector 52, the host EPL 18, and a store aisle containing the host EPL 18, in order to be seen by customers looking down store aisles. To minimize the possibility of damage to displays 54 and 56, displays 54 and 56 are preferably hinged along a line 74 adjacent surface 70 of connector 52.

Battery 55 and auxiliary display control circuitry 53 are preferably located within connector 52.

Figure 5A:
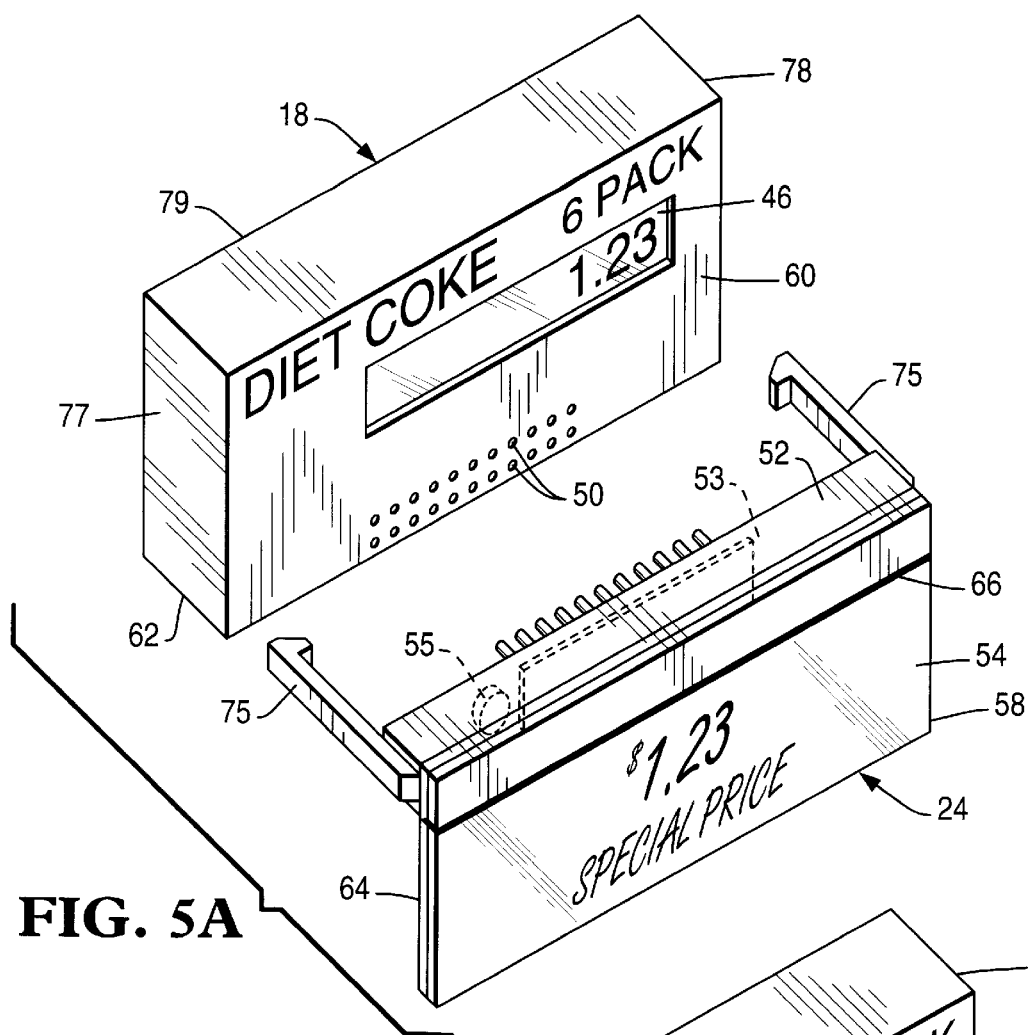
FIGS. 5A and 5B illustrate a third embodiment of the auxiliary display.
Figure 5B:
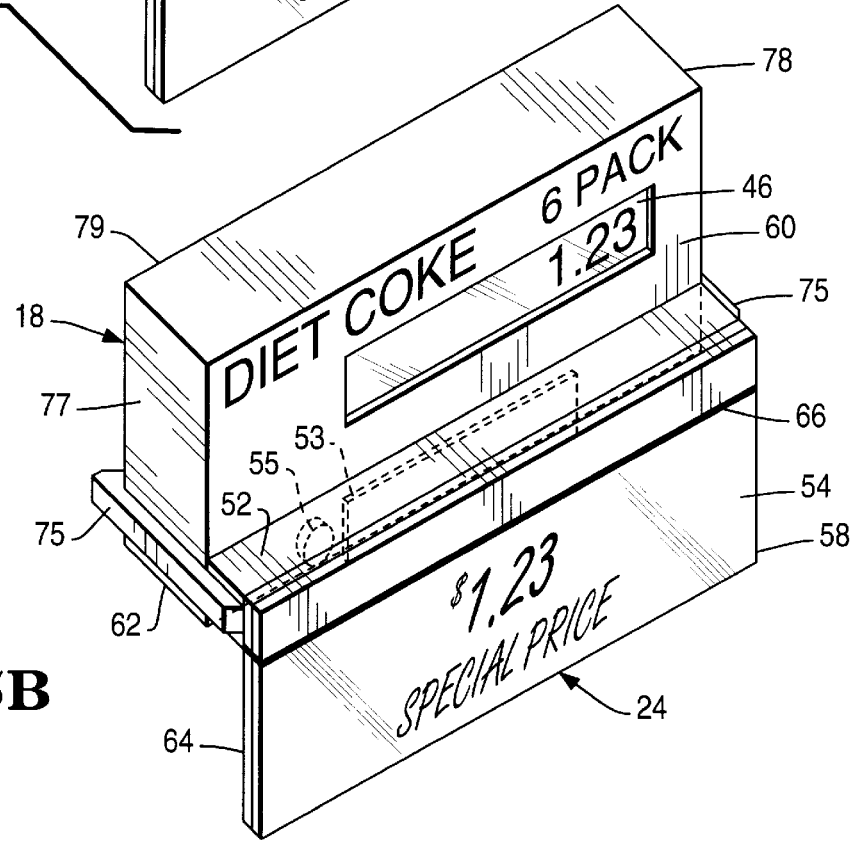

Turning now to FIGS. 5A and 5B, a third embodiment of auxiliary display 24 is illustrated in more detail.

Connector 50 is flush with the outer surface 60 of EPL 18. Connector 52 includes clips 75 which hug sides 77 and 78 and back 79 of EPL 18.

Display 54 is oriented generally parallel to the host EPL 18. To minimize the possibility of damage to display 54, display 54 is preferably mounted on a flexible circuit 64 and/or hinged along a line 66 at the base of connector 52.

Battery 55 and auxiliary display control circuitry 53 are preferably located within connector 52, but may also be located behind display 54.

Figure 6:
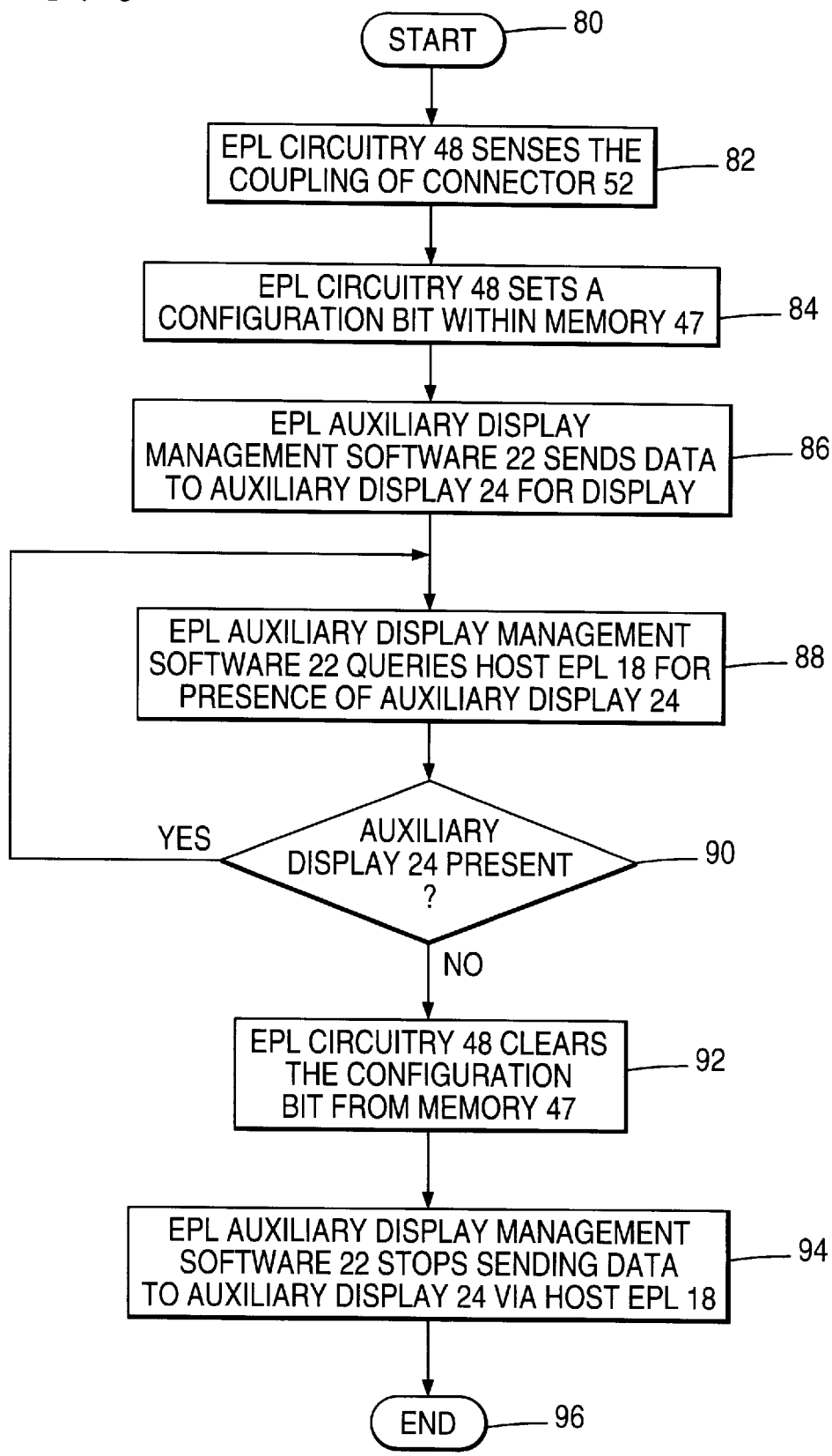
FIG. 6 is a flow diagram illustrating a method for controlling an auxiliary display, including a method for determining whether the auxiliary display is connected to an EPL.

Turning now to FIG. 6, the operation of auxiliary display 24 is explained in more detail, beginning with START 80.

In step 82, EPL circuitry 48 senses the coupling of connector 52 to connector 54 and sets the configuration bit. EPL auxiliary display management software 22 sends a message to EPL terminal 12.

In step 84, EPL circuitry 48 sets a configuration bit within memory 47. The configuration bit indicates that auxiliary display 24 is coupled to EPL 18 and may additionally indicate a type of auxiliary display 24.

In step 86, EPL auxiliary display management software 22 sends data to EPL circuitry 48, which manages the display of the data by auxiliary display 24. This data may include a promotional message and/or price information.

In step 88, EPL auxiliary display management software 22 queries EPL 18 for presence of auxiliary display 24.

In step 90, EPL auxiliary display management software 22 determines whether auxiliary display 24 is still connected. Auxiliary display 24 may be removed by store personnel or customers. EPL auxiliary display management software 22 continuously monitors EPL 18 for the presence of auxiliary display 24 by returning to step 88. Removal of connector 52 signals EPL 18 that auxiliary display 24 has been removed.

If auxiliary display 24 has been removed, EPL circuitry 48 clears the configuration bit from memory 47 in step 92.

In step 94, EPL auxiliary display management software 22 stops sending data to auxiliary display 24.

In step 96, the method ends.

Although the present invention has been described with particular reference to certain preferred embodiments thereof, variations and modifications of the present invention can be effected within the spirit and scope of the following claims.

What is claimed is:

1. An auxiliary display assembly for electronically communicating with and receiving information to be displayed from an electronic price label comprising:
   a display;
   an electrical connector coupled to the display which couples to another electrical connector on the electronic price label; and
   circuitry for receiving information to be displayed from the electronic price label and driving the display to display the received information.

2. The auxiliary display assembly as recited in claim 1, wherein the connector of the auxiliary display couples to a front face of the electronic price label.

3. The auxiliary display assembly as recited in claim 2, wherein the display is mounted substantially perpendicular to the connector.

4. The auxiliary display assembly as recited in claim 3, further comprising:
   a hinge between the display and the connector.

5. The auxiliary display assembly as recited in claim 2, wherein the display is mounted substantially parallel to the connector.

6. The auxiliary display assembly as recited in claim 1, further comprising:
   first and second retainers coupled to first and second ends of the connector which secure the connector to the electronic price label.

7. The auxiliary display assembly as recited in claim 1, wherein the connector of the auxiliary display couples to a recessed connection in a front face of the electronic price label so as to mount substantially flush with the front face of the electronic price label.

8. The auxiliary display assembly as recited in claim 1 wherein said circuitry for receiving information to be displayed and said display are mounted on a flexible circuit board to minimize the possibility of damage to the auxiliary display assembly.

9. A method of displaying information by an auxiliary display which is removably electrically connected to an electronic price label comprising the steps of:
   sensing connection of the auxiliary display to the electronic price label by circuitry within the electronic price label;
   setting an indicator within the electronic price label which indicates that the auxiliary display is connected to the electronic price label;
   querying the electronic price label for the presence of the auxiliary display by auxiliary display management software executed by a terminal that communicates with the electronic price label;
   sending data to the electronic price label for display by the auxiliary display; and
   providing the data from the electronic price label to the auxiliary display.

10. The method as recited in claim 9 wherein a plurality of different types may be electrically connected to the electronic price label, further comprising the step of:
   sensing a type associated with the auxiliary display.

11. The method of claim 10 further comprising the step of:
   utilizing the sensed type information to alter the functionality of the electronic price label to which the auxiliary display is attached while the auxiliary display is attached thereto.

12. The method as recited in claim 9, further comprising the steps of:
   monitoring the electronic price label for the presence of the auxiliary display by the auxiliary display management software;
   clearing the configuration bit from the memory by the circuitry within the electronic price label if the auxiliary display has been removed; and
   ceasing transmission of the data to the auxiliary display by the auxiliary display management software if the auxiliary display has been removed.

13. The method as recited in claim 9, wherein the data comprises promotional messages.

14. The method as recited in claim 9, wherein the data comprises price information.

15. The method of claim 9 wherein the indicator comprises a configuration bit stored within a memory of the electronic price label.

16. The method of claim 9 further comprising the step of:
   utilizing the electronic price label to update the information to be displayed by the auxiliary display as the electronic price label receives new price information.

17. The method of claim 16 further comprising the steps of:
   detecting the removal of the auxiliary display; and
   returning the electronic price label to its original functionality subsequent to detecting said removal.

* * * * *